(12) United States Patent
Zygula

(10) Patent No.: US 9,824,346 B2
(45) Date of Patent: Nov. 21, 2017

(54) SYSTEMS AND METHODS FOR SELLING AND DISTRIBUTING LOTTERY TICKETS

(71) Applicant: ZFPP, LLC, Glencoe, IL (US)

(72) Inventor: Jaroslaw F. Zygula, Elmwood Park, IL (US)

(73) Assignee: ZFPP, LLC, Glencoe, IL (US)

( * ) Notice: Subject to any disclaimer, the term of this patent is extended or adjusted under 35 U.S.C. 154(b) by 229 days.

(21) Appl. No.: 14/871,379

(22) Filed: Sep. 30, 2015

(65) Prior Publication Data

US 2017/0091742 A1    Mar. 30, 2017

(51) Int. Cl.
| | |
|---|---|
| *A63F 9/24* | (2006.01) |
| *G06Q 20/20* | (2012.01) |
| *G06Q 20/10* | (2012.01) |
| *G07F 17/32* | (2006.01) |

(52) U.S. Cl.
CPC .......... *G06Q 20/202* (2013.01); *G06Q 20/10* (2013.01); *G07F 17/329* (2013.01); *G07F 17/3244* (2013.01)

(58) Field of Classification Search
USPC ...................................... 463/16–42
See application file for complete search history.

(56) References Cited

U.S. PATENT DOCUMENTS

| | | | |
|---|---|---|---|
| 2003/0207708 A1* | 11/2003 | Sadri ...................... | G06Q 20/04 463/17 |
| 2004/0023711 A1* | 2/2004 | Knapp .................. | A63F 3/0665 463/17 |
| 2004/0032083 A1* | 2/2004 | Walker ................. | G06Q 10/087 273/269 |
| 2005/0167922 A1* | 8/2005 | Finocchio ............. | A63F 3/0665 273/292 |

* cited by examiner

*Primary Examiner* — Masud Ahmed
(74) *Attorney, Agent, or Firm* — Richards Patent Law P.C.

(57) ABSTRACT

The present disclosure provides a fractional lottery transaction system that enables users to round up their purchase price when purchasing an item from a merchant, wherein the round up amount may be used to purchase a fractional amount of a lottery ticket. If the lottery ticket that is purchased is deemed a winner by a lottery establishment, the system determines the fractional amount of the winnings each fractional owner receives.

10 Claims, 2 Drawing Sheets

SYSTEMS AND METHODS FOR SELLING AND DISTRIBUTING LOTTERY TICKETS

BACKGROUND OF THE INVENTION

The present subject matter relates generally to systems and methods for selling portions of lottery tickets.

Lotteries are lucrative games for sponsors, as well as winners. Conventional lottery systems include a player purchasing a lottery ticket having a serial number that identifies the lottery ticket. On a drawing date, the lottery agency randomly selects at least one ticket number as the winning ticket number. The lottery tickets that match the winning ticket number are deemed the lottery winners and typically receive a prize of money.

Customers may want to purchase only a fraction of a ticket and split the winnings with the other owners of the ticket. However, lottery agencies typically only sell entire tickets. Lottery agencies and their systems and infrastructure have not previously been adapted to support a fractional lottery ticketing system.

In addition, dispensing and collecting coins at a typical retail point-of-sale terminal, is costly, burdensome, and inconvenient to both the merchants and the customers. Many customers would prefer to not receive coins as change. As a result, many customers may prefer fractional ownership of a lottery ticket to receiving change.

Accordingly, there is a need for a system that converts the change that would be given in a typical purchase transaction at a point-of-sale into fractional purchases of lottery tickets.

BRIEF SUMMARY OF THE INVENTION

The present disclosure provides systems and methods for purchasing fractional lottery tickets. Various examples of the methods and systems are provided herein.

The present disclosure provides a fractional transaction server in communication with a point-of-sale system at a retailer or merchant establishment (physical establishments or online). Upon completion of a transaction including the purchase of an item from the merchant, the user may decide to round up the purchase price to the next dollar increment amount. For example, if the purchase price was $16.75, then the user may decide to round up the purchase price to $17.00, wherein the difference between the purchase price and the round up price of $0.25 may be used to purchase a portion of a lottery ticket. The point-of-sale system communicates the round up amount ($0.25) and a user identity to the fractional transaction server. Upon receiving the round up amount, the fractional transaction server updates a database that stores a plurality of round up amounts and associated user identities. The fractional transaction server cumulates the round up amounts associated with the user identity, or a plurality of user identities, to purchase at least one lottery ticket. The fractional transaction server stores the ownership fraction associated with each user identity of the lottery ticket.

In an example, upon completion of the purchase, the fractional transaction server communicates with the point-of-sale system a plurality of eligible lottery programs to present to the user. The user may then select the lottery program his or her round up amount will be used to purchase a fraction of a lottery ticket associated with the selected lottery program. The user may select more than one lottery program the user's round up amount is applied towards. In addition, the user may select to purchase an entire lottery ticket where the user will be charged the sum of the item amount and the full lottery ticket amount.

In an embodiment, the fractional lottery ticket system includes a fractional transaction controller in communication with a point-of-sale server and a master lottery server, and a memory coupled to the controller, wherein the memory is configured to store program instructions executable by the controller. In response to executing the program instructions, the fractional transaction controller is configured to receive a user identity and a round up amount from the point-of-sale server, provide to the point-of-sale server, a plurality of eligible lottery programs, receive from the point-of-sale server, a selected lottery program, wherein the selected lottery program is selected from the eligible lottery programs. The controller is further configured to update a database in communication with the controller with the user identity, the round up amount, and the selected lottery program, wherein the database includes a plurality of user identities having associated round up amounts and selected lottery programs. In addition, the controller is configured to cumulate at least two round up amounts wherein a sum of the at least two round up amounts totals a full lottery ticket price of a full lottery ticket associated with the selected lottery program, and purchase the full lottery ticket from the master lottery server, wherein the full lottery ticket is associated with a lottery ticket number. The controller is also configured to calculate an ownership fraction of ownership of the purchased full lottery ticket for each of the user identities associated with the at least two round up amounts cumulated to purchase the full lottery ticket, and store the ownership fraction associated with each user identities in the database. Upon receiving a winning lottery ticket number and winning amount from the master lottery system, the controller is configured to calculate, for each of the user identities associated with a lottery ticket number that matches the winning lottery ticket number, a fractional winning amount. In addition, the controller is configured to update the database, for each of the user identities associated with a lottery ticket number that matches the winning lottery ticket number, the fractional winning amount.

In an example, the fractional transaction controller if further configured to notify each user associated with each of the user identities associated with the lottery ticket number that matches the winning lottery ticket number, the fractional winning amount.

In yet another example, the fractional transaction controller if further configured to receive winning funds associated with the winning lottery ticket number from the master lottery server, and distribute, to each of the user identities associated with a lottery ticket number that matches the winning lottery ticket number, the fractional winning amount.

The round up amount may be less than a dollar. The round up amount is equivalent to the difference between a purchase price of an item and the next dollar increment of the purchase price.

In an example, the sum of the ownership fractions associated with purchased full lottery ticket is one. In an example, the fractional winning amount, associated with each of the user identities associated with a lottery ticket number that matches the winning lottery ticket number, is equivalent to the ownership fraction multiplied by the winning amount.

In another example, the point of sale server is configured to generate a purchase price associated with an item for purchase, wherein the point of sale server is associated with a merchant providing a plurality of items for sale, calculate a round up amount associated with the purchase price, wherein the round up amount is the difference between the purchase price and the next dollar increment of the purchase price, and communicate the round up amount to the fractional transaction controller.

The fractional transaction server may be in communication with a plurality of master lottery servers. The fractional transaction server may be in communication with a plurality of point of sale servers.

An advantage of the present system is allowing users to take advantage of the change from a purchase transaction by purchasing a fraction of a lottery ticket.

A further advantage of the present system is not requiring significant changes to the systems and infrastructure of conventional lottery companies.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
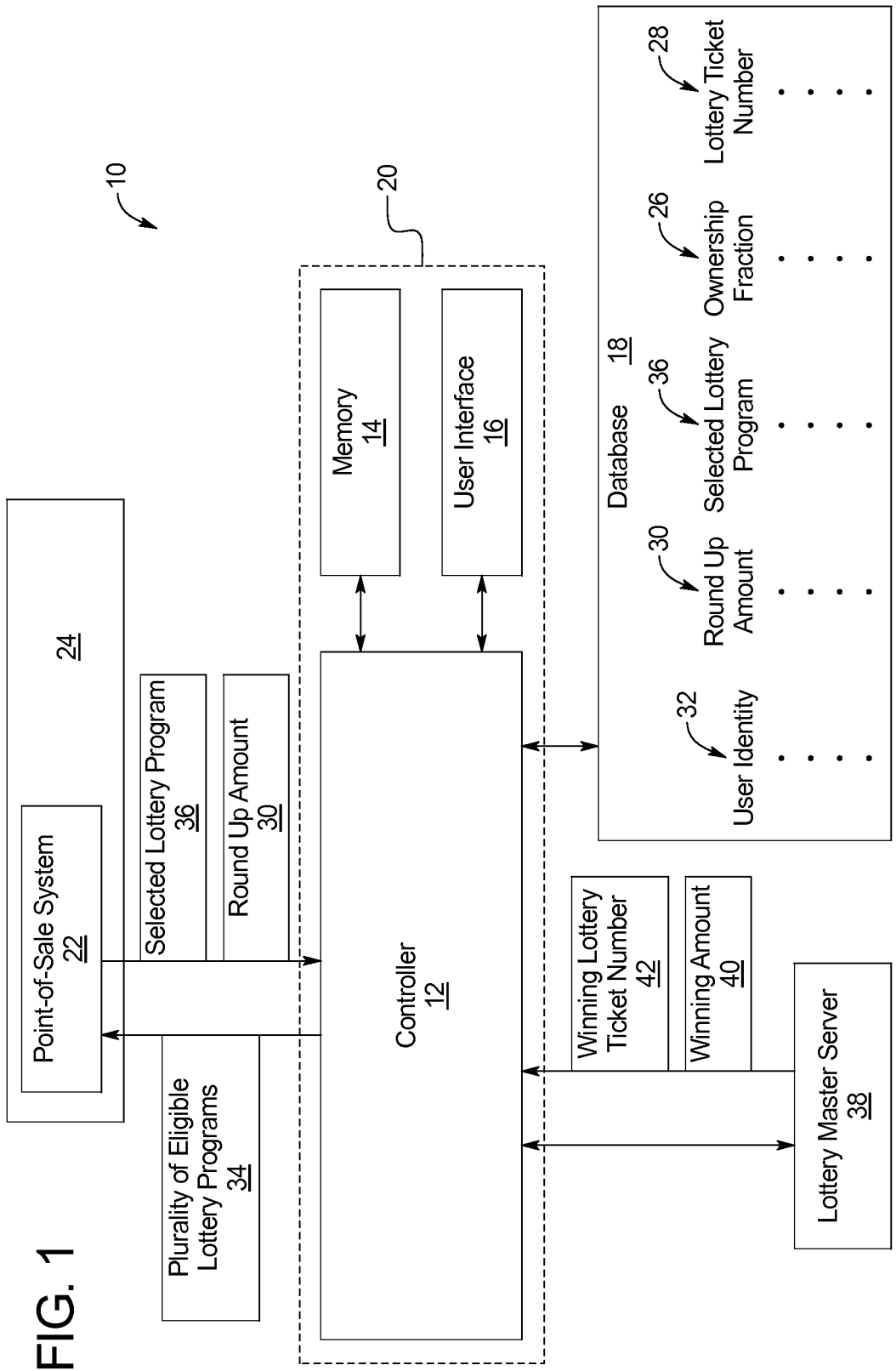
FIG. 1 is a schematic of an embodiment of the system as disclosed herein.

The present disclosure provides a fractional lottery transaction system 10 that enables users to round up their purchase price when purchasing an item from a merchant, wherein the round up amount may be used to purchase a fractional amount of a lottery ticket. If the lottery ticket that is purchased is deemed a winner by a lottery establishment, the system determines the fractional amount of the winnings each fractional owner receives.

The fractional lottery transaction system 10 includes a fractional transaction controller 12 in communication with a point-of-sale system 22 at a retailer or merchant establishment 24 (physical establishments or online). Before completion of a transaction including the purchase of an item from the merchant 24, the user may decide to round up the purchase price to the next dollar increment amount. For example, if the purchase price was $16.75, then the user may decide to round up the purchase price to $17.00, wherein the difference between the purchase price and the round up price (the round up amount 30) of $0.25 may be used to purchase a portion 26 of a lottery ticket 28. The point-of-sale system 22 communicates the round up amount 30 ($0.25) and a user identity 32 to the fractional transaction server 20. Upon receiving the round up amount 30, the controller 12 updates a database 18 that stores a plurality of round up amounts 30 and associated user identities 32. The controller 12 cumulates the round up amounts 30 associated with the user identity 32, or a plurality of user identities 32, to purchase at least one lottery ticket number 28. The controller 12 stores the ownership fraction 26 of ownership associated with each user identity 32 of the lottery ticket number 28 in the database 18.

Figure 2:
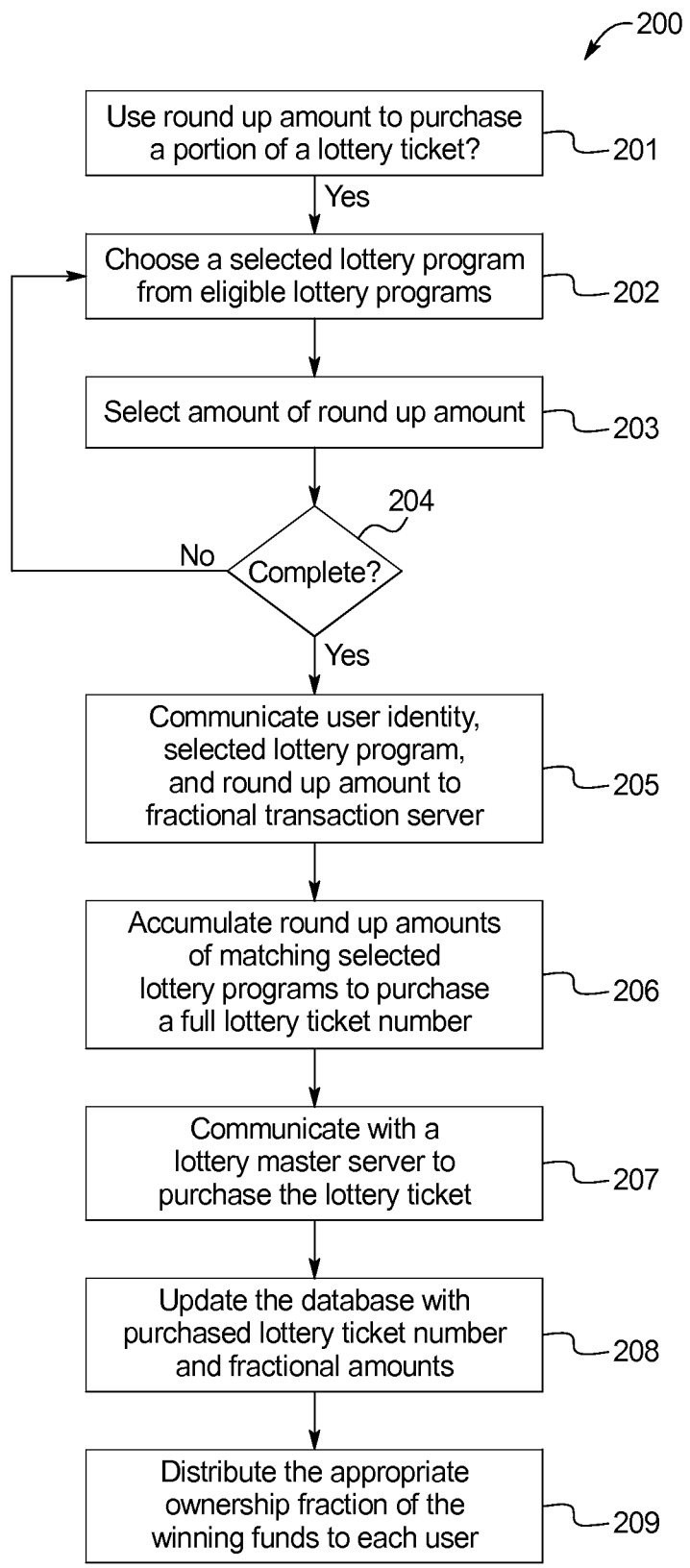
FIG. 2 is a flow chart of the system disclosed herein.

FIG. 2 illustrates a method 200 for operating a fractional lottery transaction system 10. As shown in FIG. 2, for example, before completion of the purchase via the point of sale system 22, the controller 12 communicates to the point-of-sale system 22 a plurality of eligible lottery programs 34 to present to the user. At step 201, if the user chooses to purchase a portion of a lottery ticket, the user may then, at step 202, select a selected lottery program 36 for which his or her round up amount 30 will be used to purchase an ownership fraction 26. The user may select more than one selected lottery program 36 that the user's round up amount 30 is applied towards. In addition, the user may select to purchase an entire lottery ticket number 28 where the user will be charged the sum of the item amount and the full lottery ticket amount. Alternatively, the user may select any amount as the round up amount 30, as shown in step 203. In other words, the round up amount 30 is not limited to the next dollar increment. For example, the user may select a round up amount of $5.50 and select a selected lottery program 36, wherein each lottery ticket of the selected lottery program 36 costs $2.00. Therefore, the round up amount 30 of $5.50 will purchase 2.5 lottery tickets.

In addition, the user may select more than one selected lottery programs 36. As shown at step 204, the user may select from the eligible lottery programs 36 until the user has indicated that the selection is complete. For example, the user may select a portion of his round up amount 30 to be used to purchase an ownership fraction 26 of a first selected lottery program 36, and a second portion of the round up amount 30 to purchase an ownership fraction 26 of a second lottery program 36. Alternatively, the user may select to use the entire round up amount 30 to purchase a ownership fraction 26 of a single selected lottery program 36.

As shown in step 205, the controller 12 updates the database 18 with the received the one or more selected lottery programs 36, the associated user identity 32, and the round up amount 30. At step 206, the controller accumulates round up amounts of matching selected lottery programs to purchase a full lottery ticket number. For example, the controller 12 may determine for the selected lottery program 36 a plurality of user identities 32, wherein the round up amount 30 of the selected lottery program 36 associated with each user identity 32 adds up to a cost of a whole lottery ticket 28 of the selected lottery program 36. The controller 12 is configured to record and track the ownership fraction 26 of the selected lottery program 36 for each user identity 32.

At step 207, the controller 12 is further configured to communicate with a lottery master server 38 to purchase the lottery ticket 28 associated with the selected program 36, wherein the lottery ticket 28 has an associated lottery number 40. The lottery master server 38 may be any lottery ticket vendor that sells lottery tickets 28 that are associated with at least one lottery program 34. Upon purchasing, at step 208, the controller 12 is configured to update the database 18 to add the lottery ticket number 28 to each of the user identities 32 associated with the plurality of user identities 32 owning an ownership fraction 26 of the lottery ticket 28.

Upon a lottery master server 38 selecting a winning lottery ticket number 42, the controller 12 is configured to receive the winning lottery ticket number 42 and identify the plurality of user identities 32 associated with the lottery ticket number 28 matching the winning lottery ticket number 42. In addition, the controller 12 may be configured to calculate the proportion of winning funds each user identity 32 should receive based on the ownership fractions 26 of ownership of the winning lottery ticket number 28.

Upon receiving winning funds associated with the winning lottery ticket number 42, at step 209, the controller 12 may be configured to distribute the appropriate ownership fraction 26 of the winning funds to each of the plurality of user identities 32 owning an ownership fraction 26 of the winning lottery ticket number 42. Alternatively, the controller 12 merely notifies each of the plurality of user identities 32 owning an ownership fraction 26 of the winning lottery ticket number 42 of their appropriate ownership fraction 26 of the winning funds 44. The user associated with the user identity 32 owning an ownership fraction 26 of the winning lottery ticket number 42 may then contact the lottery master server 38 for disbursement of their fraction amount 26 of the winning funds.

In an embodiment, the controller 12 is configured to determine whether the round up amount 30 is equivalent to the purchase price of a full lottery ticket 28. If the round up amount 30 is equivalent to the price of a lottery ticket, the controller 12 is configured to purchase a ticket from the lottery master server 38. If the round up amount 30 is not equivalent to the purchase price of an entire lottery ticket 28, the controller 12 updates the database 18 with the round up amount 30 associated with the user identity 32 stored in the database 18. In an example, the user may set a preference that instead of the controller 12 cumulating his round up amount 30 with other round up amounts 30 associated with other user identities 32, the user may prefer the system 10 to purchase a full lottery ticket number 28 once the sum of the round up amounts 30 associated with the particular user identity 32 totals the price of a full lottery ticket 28, wherein the user would own the entire lottery ticket number 28.

As mentioned above and schematically shown in FIG. 1, aspects of the systems and methods described herein are controlled by one or more controllers 12. The one or more controllers 12 may be adapted to run a variety of application programs, access and store data, including accessing and storing data in the associated databases 16, and enable one or more interactions as described herein. Typically, the controller 12 is implemented by one or more programmable data processing devices. The hardware elements, operating systems, and programming languages of such devices are conventional in nature, and it is presumed that those skilled in the art are adequately familiar therewith.

For example, the one or more controllers 12 may be a PC based implementation of a central control processing system utilizing a central processing unit (CPU), memory 14 and an interconnect bus. The CPU may contain a single microprocessor, or it may contain a plurality of microprocessors for configuring the CPU as a multi-processor system. The memory 14 may include a main memory, such as a dynamic random access memory (DRAM) and cache, as well as a read only memory, such as a PROM, EPROM, FLASH-EPROM, or the like. The system may also include any form of volatile or non-volatile memory 14. In operation, the memory 14 stores at least portions of instructions for execution by the CPU and data for processing in accord with the executed instructions.

The one or more controllers 12 may also include one or more input/output interfaces for communications with one or more processing systems. Although not shown, one or more such interfaces may enable communications via a network, e.g., to enable sending and receiving instructions electronically. The communication links may be wired or wireless. The network may include a cloud platform including cloud computing. The cloud computing may provide computation, software, data access, storage resources, and other computing infrastructure.

The one or more controllers 12 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces 30 for the controller 12. For example, the one or more controllers 12 may include a graphics subsystem to drive the output mechanism. The links of the peripherals to the system may be wired connections or use wireless communications.

Although summarized above as a PC-type implementation, those skilled in the art will recognize that the one or more controllers 12 also encompasses systems such as host computers, servers, workstations, network terminals, and the like. Further one or more controllers 12 may be embodied in a device, such as a mobile electronic device, like a smartphone or tablet computer. In fact, the use of the term controller 12 is intended to represent a broad category of components that are well known in the art.

Hence aspects of the systems and methods provided herein encompass hardware and software for controlling the relevant functions. Software may take the form of code or executable instructions for causing a controller 12 or other programmable equipment to perform the relevant steps, where the code or instructions are carried by or otherwise embodied in a medium readable by the controller 12 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller 12 can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. A fractional lottery ticket system comprising:
    a fractional transaction controller in communication with a point-of-sale server and a master lottery server;
    a memory coupled to the controller, wherein the memory is configured to store program instructions executable by the controller;
    wherein in response to executing the program instructions, the fractional transaction controller is configured to:
    receive a user identity and a round up amount from the point-of-sale server;
    provide to the point-of-sale server, a plurality of eligible lottery programs;
    receive from the point-of-sale server, a selected lottery program, wherein the selected lottery program is selected from the eligible lottery programs;
    update a database in communication with the controller with the user identity, the round up amount, and the selected lottery program, wherein the database includes a plurality of user identities having associated round up amounts and selected lottery programs;
    cumulate at least two round up amounts wherein a sum of the at least two round up amounts totals a full lottery ticket price of a full lottery ticket associated with the selected lottery program;
    purchase the full lottery ticket from the master lottery server, wherein the full lottery ticket is associated with a lottery ticket number;
    calculate an ownership fraction of ownership of the purchased full lottery ticket for each of the user identities associated with the at least two round up amounts cumulated to purchase the full lottery ticket;
    store the ownership fraction associated with each user identities in the database;
    upon receiving a winning lottery ticket number and winning amount from the master lottery system, calculate, for each of the user identities associated with a lottery ticket number that matches the winning lottery ticket number, a fractional winning amount; and
    update the database, for each of the user identities associated with a lottery ticket number that matches the winning lottery ticket number, the fractional winning amount.

2. The system of claim 1 wherein the fractional transaction controller if further configured to
    notify each user associated with each of the user identities associated with the lottery ticket number that matches the winning lottery ticket number, the fractional winning amount.

3. The system of claim 1 wherein the fractional transaction controller if further configured to
    receive winning funds associated with the winning lottery ticket number from the master lottery server; and
    distribute, to each of the user identities associated with a lottery ticket number that matches the winning lottery ticket number, the fractional winning amount.

4. The system of claim 1 wherein the round up amount is less than a dollar.

5. The system of claim 1 wherein the sum of the ownership fractions associated with purchased full lottery ticket is one.

6. The system of claim 1 wherein the fractional winning amount, associated with each of the user identities associated with a lottery ticket number that matches the winning lottery ticket number, is equivalent to the ownership fraction multiplied by the winning amount.

7. The system of claim 1 wherein the round up amount is equivalent to the difference between a purchase price of an item and the next dollar increment of the purchase price.

8. The system of claim 1 wherein the point of sale server is configured to
    generate a purchase price associated with an item for purchase, wherein the point of sale server is associated with a merchant providing a plurality of items for sale;
    calculate a round up amount associated with the purchase price, wherein the round up amount is the difference between the purchase price and the next dollar increment of the purchase price; and
    communicate the round up amount to the fractional transaction controller.

9. The system of claim 1 wherein the fractional transaction server is in communication with a plurality of master lottery servers.

10. The system of claim 1 wherein the fractional transaction server is in communication with a plurality of point of sale servers.

* * * * *